2,900,263
Patented Aug. 18, 1959

2,900,263

METHOD OF PREPARING A FUEL ELEMENT FOR A NUCLEAR REACTOR

Joseph H. Handwerk, Joliet, and Roland A. Bach, La Grange, Ill., assignors to the United States of America as represented by the United States Atomic Energy Commission No Drawing. Application February 13, 1957
Serial No. 640,056

3 Claims. (Cl. 106—39)

This invention relates to a method of preparing a fuel element for a nuclear reactor. More particularly the invention relates to a method of preparing a corrosion-resistant ceramic reactor fuel element.

Ceramic materials such as uranium dioxide ($UO_2$) and thorium dioxide ($ThO_2$) have been suggested for use in nuclear reactors because of their stability under oxidizing conditions, good corrosion resistance, lack of undesirable phase transformations and high fusion point. Fuel elements for nuclear reactors containing a mixture of thorium dioxide and uranium dioxide are disclosed in patent application Serial No. 612,906, filed September 28, 1956, on behalf of John M. West and James F. Schumar, now Patent No. 2,838,452, issued on June 10, 1958. Fuel elements of this type are suitable for use in water-moderated reactors wherein the water is heated by the fuel to form steam. Reference is made to Untermyer application Serial No. 518,427, filed June 28, 1955, for a complete description of details of construction and operation of a reactor of this type.

Mixtures of thorium dioxide and uranium dioxide are employed because uranium dioxide alone is not very satisfactory as a reactor fuel in some of the more common types of reactors. For example, uranium dioxide bodies are not satisfactory for use in the aforementioned Untermyer reactor because of the possibility that the moderator might penetrate the cladding for the fuel elements. If the moderator did penetrate the fuel element, as would be quite likely to happen at some time during the life of the reactor, the uranium dioxide would disintegrate.

Uranium dioxide fuel is not very satisfactory in any reactor in which it is or may be subject to an oxidizing atmosphere. In a water-cooled reactor the oxidizing atmosphere exists because of the effect of radiation on the water used as moderator. It is believed that the cause for the disintegration of the uranium dioxide is that it has a tendency to oxidize to $U_3O_8$ in an oxidizing atmosphere, and this change in form is accompanied by an increase in volume. Thorium dioxide on the other hand does not have this tendency to oxidize since it forms no higher oxide. It has also been found that mixtures of thorium dioxide and uranium dioxide are not seriously affected even if the moderator does penetrate the housing. Use of thorium dioxide along with the uranium dioxide offers the additional advantage that additional fissionable material may be bred from the thorium.

Thus we see that ceramic fuel elements and particularly those containing a mixture of uranium dioxide and thorium dioxide are very important at present and likely to become more so in the future. Unfortunately, difficulties have been encountered in the preparation of ceramics containing a mixture of uranium dioxide and thorium dioxide. When a mixture of thorium dioxide and uranium dioxide is fired in an oxidizing atmosphere such as air, the uranium dioxide in the mixture will be oxidized to $U_3O_8$ at temperatures below 700° C. and then reduced back to uranium dioxide above 700° C. The oxidation to $U_3O_8$ is accompanied by a volume increase which ruptures the body. Previous workers in the art have restricted their attention to methods of protecting ceramic fuel elements composed of $UO_2$ and $ThO_2$ against oxidation of the $UO_2$ by procedures in which the mixture is fired in a high vacuum or in a high-purity hydrogen atmosphere. All of these methods had one objective in view—prevention of the formation of $U_3O_8$ by oxidation of $UO_2$. These methods result in satisfactory fuel elements but only at greatly increased cost because of the difficulty in carrying out such procedures.

It would therefore be extremely desirable to develop a method for preparing ceramic fuel elements containing uranium dioxide and thorium dioxide whereby the ceramic can be prepared by firing a mixture of readily available constituents in air, and this is the object of the present invention.

This object of the invention is satisfied by our novel method of preparing ceramic fuel elements containing thorium dioxide and uranium dioxide which comprises forming a mixture of thorium dioxide and an oxide of uranium in which the uranium is present in an oxidation state higher than it is in uranium dioxide into the desired size and shape and firing in air at a temperature sufficiently high to reduce the higher oxide of uranium present therein to uranium dioxide. The selection of a higher oxide offers an additional advantage over the use of $UO_2$, since a hydrogen reduction step is saved because $UO_2$ is made from the higher oxides such as $U_3O_8$ and $UO_3$ by hydrogen reduction.

We have found surprisingly that a mixture of thorium dioxide and $U_3O_8$ or other higher oxides of uranium can be fired in air to obtain a ceramic body which is suitable for use as a nuclear reactor fuel element. This is the direct opposite of the prior art methods previously referred to since we use $U_3O_8$ as a starting material while the previous workers in the art went to great pains to prevent the formation of $U_3O_8$. It is believed that the reason that a satisfactory fuel element can be prepared in this manner is that the $U_3O_8$ or other higher oxide such as $UO_3$ decomposes to uranium dioxide at temperatures above 700° C. The decomposition results in shrinkage of the body or the formation of voids therein. The decomposition takes place at a temperature sufficiently high so that internal stresses resulting from shrinkage of the body or the formation of voids therein are relieved without cracking.

As the higher oxide is reduced to uranium dioxide, it dissolves in the thorium dioxide forming a solid solution therewith causing the reaction to proceed more nearly to completion.

It is important that the firing temperature be sufficiently high so that all or substantially all of the higher oxide of uranium be reduced to uranium dioxide. The minimum temperature required depends on the proportion of uranium within the mixture. For a mixture of $U_3O_8$ and thorium dioxide containing only 1% uranium dioxide (calculated), the firing temperature must be above about 1450° C. The preferable temperature, however, would be over 1700° C. to obtain faster reaction speed. As the proportion of uranium dioxide increases the preferable temperature will increase up to around 2000° C. The maximum temperature permissible is, of course, determined by the fusion temperature of the mixture.

In general, our novel method comprises intimately mixing finely divided $U_3O_8$ or $UO_3$ with thorium dioxide, pressing the mixture to form a body of the desired size and shape, and firing the body at a temperature between 1450° C. and the fusion point of the mixture to obtain a ceramic body suitable for use as a fuel element in a nuclear reactor.

Mixing of the mixture must be complete. Mixing of the mixture can be accomplished either by wet milling or by dry milling. The procedures are as follows: (1) Water and a small amount of a binder is added to the required quantity of finely ground uranium oxide and thorium dioxide; the mixture is wet milled and the water removed by drying; the composition is then re-tempered by the addition of about 2% water and is pressed into the required size and shape; and the resulting body is fired at a temperature sufficiently high to reduce the uranium oxide to uranium dioxide.

(2) The mixture of uranium oxide and thorium dioxide is dry milled; a small quantity of water is added thereto and the mixture is granulated by passing it through a screen; a binder is added and the mixture is formed into shape by pressure; and the resulting body is fired as before.

A mineralizer or sintering aid such as calcium oxide, magnesium oxide, or calcium fluoride may be used to obtain better densification and to avoid the use of high forming pressures and high firing temperatures.

In addition to pressing the fuel bodies may be formed by slip casting. See "The Preparation of Refractories from Uranium Oxide," J. Am. Ceramic Society, 36 (4), 137–40 (1953), for a discussion of this subject.

A number of compositions containing $U_3O_8$ and $ThO_2$ were prepared and examined visually. All specimens were prepared by wet milling and dry pressing into right cylinders ¼" in length. The compositions were fired to 1700°–1750° C. in air. Ware containing up to 30 weight percent $U_3O_8$ was free of visible defects and underwent no visible changes when reheated in air to 1400° C. for periods up to 96 hours. The geometric densities of these samples ranged from 7.85 gm./cc. for compositions containing 2½ weight percent $UO_2$ (added as an equivalent amount of $U_3O_8$) to 7.00 g./cc. for compositions containing 30 weight percent $UO_2$ (added as an equivalent amount of $U_3O_8$).

Compositions containing between 30% and 70% $UO_2$ were somewhat cracked but indications are that they would be satisfactory for use as fuel elements.

Since these tests showed that it is possible to prepare good ceramic bodies by firing a mixture of $U_3O_8$ and $ThO_2$ in air, a number of such bodies were prepared and irradiation tests made thereon. The ceramic bodies prepared were cylinders .25" in diameter. The bodies containing 2½% $UO_2$ were .375 inch long while the bodies containing 10% $UO_2$ were .50 inch long. All of the bodies were mixed by wet milling. All samples were fired in air.

The irradiation tests were carried out in an enriched-uranium heavy-water-moderated research reactor having a thermal neutron flux of $2-3 \times 10^{13}$ neutrons/cm.² sec. known as CP–5 and in an enriched-uranium, light-water-moderated research reactor having a thermal neutron flux of $3-4 \times 10^{14}$ neutrons/cm.² sec. known as MTR. The tests in CP–5 were carried out in pressurized water autoclaves at a temperature of 500–520° F. and a pressure of 680–810 p.s.i. and the tests in the MTR were carried out in capsules containing NaK.

The table following gives the details of these tests.

Table

| Wt. Percent $UO_2$ | Fired to— | | Reactor | Time of Test,[1] hrs. | Jacketing[2] | Bonding | Environment | Condition |
|---|---|---|---|---|---|---|---|---|
| | Temp. of— °C. | Density of— G./cc. | | | | | | |
| 2½ | 1,850 | 9.58 | CP–5 | 440 | Bare | None | Pressurized water | Slight crack. |
| 2½ | 1,850 | 9.58 | CP–5 | 1,100 | Zircalloy II | do | do | Some fragmentation. |
| 2½ | 1,850 | 9.58 | CP–5 | 1,100 | Type 347 stainless steel | do | do | Do. |
| 2½ | 1,850 | 9.58 | MTR | 3,000 | Bare | do | NaK | Sound. |
| 2½ | 1,850 | 9.58 | MTR | 3,000 | Al—1% Ni | Nak | do | Do. |
| 2½ | 1,850 | 9.58 | MTR | 3,000 | Type 347 stainless steel | None | do | Do. |
| 2½ | 1,850 | 9.58 | MTR | 3,000 | Zircalloy II | do | do | Do. |
| 10% | 1,800–1,830 | 9.2 | CP–5 | 260–1,590 | Al—1% Ni | Lead | Pressurized water | Intact but fragmented. |
| 10% | 1,800–1,830 | 9.2 | CP–5 | 1,042 | Zircalloy II | do | do | Do. |
| 10% | 1,800–1,830 | 10.06 | MTR | 1,400 | Al—1% Ni | do | NaK | Sound. |
| 10% | 1,800–1,830 | 10.06 | MTR | 1,400 | do | Gas | do | Do. |

[1] Time is calculated time at full power of reactor.
[2] Some jackets had a 20-mil hole drilled therethrough after the samples were in place.

Post irradiation examination of the samples showed that all were intact although a few had fragmented and others had microscopic cracks therein. Dimensional changes, if any, were slight under the test conditions and fission products were apparently well contained within the specimen capsules. The samples were subjected to sufficient thermal cycles to make it evident that they would stand up under a reasonable number of temperature changes.

These preliminary tests indicated that a thorium dioxide-uranium dioxide solid solution fuel would be feasible and that the ceramic material could be fabricated with little or no difficulty.

Accordingly, it was decided to employ fuel elements prepared as described herein as the fuel for the light-water-moderated, enriched-uranium research reactor known as Borax-IV. The composition of the mixture employed was 93.41 weight percent thorium dioxide and 6.59 weight percent $U_3O_8$. The $U_3O_8$ used was above 90% enrichment in $U^{235}$.

Both the thorium dioxide and $U_3O_8$ employed were —325 mesh. The thorium dioxide was calcined overnight at 1000° C. to improve its pressing characteristics.

The $U_3O_8$ and thorium dioxide were mixed by dry milling in a porcelain lined pebble mill employing porcelain pebbles with 2½ weight percent of the batch of polyvinyl alcohol added as a binder. The constituents were mixed for three hours.

The dry powder was dampened with 12 weight percent of water containing 0.5 weight percent of an aerosol. The moist mixture was forced through a 16 mesh screen to form granules and the granulated material was dried at 80° C. for four hours.

Before pressing 1 weight percent of a mixture of 50 weight percent kerosene and 50 weight percent oleic acid was added as a lubricant. The material was pressed in a double acting press at 14,000 p.s.i. The diameter of the resulting pellets was controlled by the die size and varied from .267" to .270". The length of the pellets was controlled by the free flowing characteristics of the granulated material and varied between .750" and .375".

The pellets were heated overnight at 260° C. in alumina crucibles in an electric furnace to remove most of the organic binder. They were then transferred to a gas fired furnace where they were fired in air to 1750° C. in approximately 16 hours. The peak temperature was held for two hours, and the ware was allowed to cool in the furnace to room temperature.

The fired ware was found to have an average geometric density of 8.3 g./cc. and an average apparent density of 9.8 g./cc. The fired ware in general was of uniform appearance and rejects averaged less than 4%.

The ceramic pellets resulting were loaded into subassemblies of the type disclosed and claimed in the patent application of West and Schumar previously referred to, and the subassemblies were employed as fuel for Borax-IV which has gone critical and is undergoing tests preparatory to placing it in full operation.

Thus it is apparent that fuel elements prepared as described hereinbefore are satisfactory and that our invention makes it possible to prepare them easily and cheaply.

It will be understood that this invention is not to be limited to the details given herein but that it may be modified within the scope of the appended claims.

What is claimed is:

1. A method of preparing a reactor fuel element which comprises forming a mixture of thorium dioxide and an oxide of uranium in which the uranium is present in an oxidation state at least as high as it is in $U_3O_8$ into a desired shape and firing in air at a temperature sufficiently high to reduce the higher uranium oxide to uranium dioxide.

2. A method of preparing a reactor fuel element which comprises intimately mixing finely ground $U_3O_8$ and thorium dioxide, the resulting mixture containing not over 70 weight percent $U_3O_8$, pressing the mixture into a compact mass, and firing in air at a temperature above 1450° C., the mass after firing containing not over 70 weight percent $UO_2$ added as an equivalent amount of $U_3O_8$.

3. A method of preparing a reactor fuel element which comprises intimately mixing 6.59 weight percent, −325 mesh $U_3O_8$ and 93.41 weight percent thorium dioxide, pressing the mixture into a compact mass at 14,000 p.s.i., and firing in air at a temperature of 1750° C.

References Cited in the file of this patent

UNITED STATES PATENTS 2,599,946    Sheft et al. _____ June 10, 1952

OTHER REFERENCES

The Chem. of Uranium, by Katz and Robinowitch, McGraw-Hill Book Co., Inc., N.Y. (1951), pp. 249–251, 254, 255.

TID–7530, part 1, Ceramic Information Meeting held Oct. 1–3, 1956; pages 144–147, issued April 1957. Available for $1.00 from OTS, Dept. of Comm., Wash. 25, D.C.

Proceedings of the International Conference on the Peaceful Uses of Atomic Energy, vol. 9, Aug. 8–20, 1955, United Nations, N.Y., 1956; pages 170, 171, 184.